Sept. 1, 1925.
H. G. HERSEY
WEATHERPROOF POLE OR POST
Filed Nov. 26, 1924
1,552,300
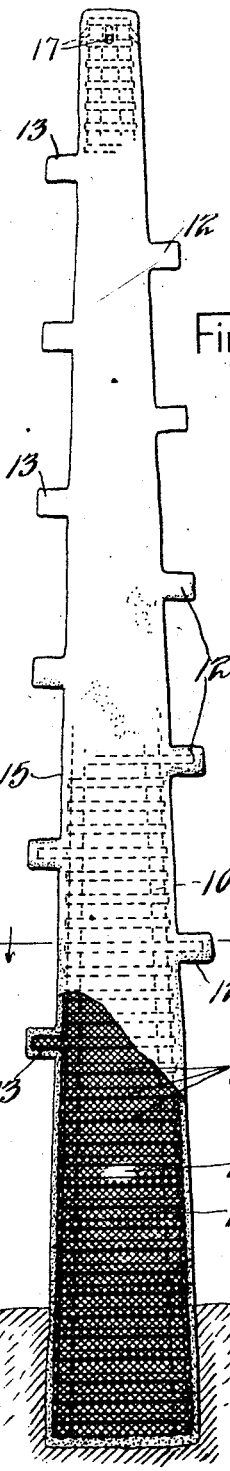
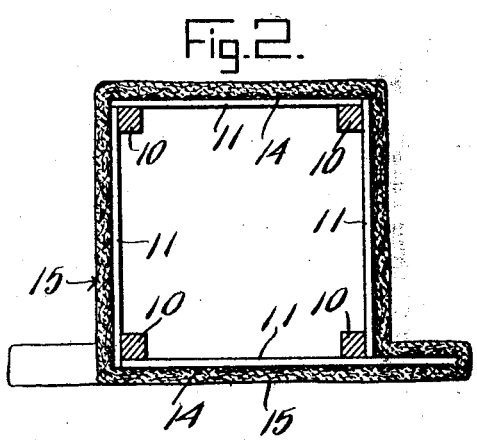
Inventor
Harry G. Hersey Patented Sept. 1, 1925.

1,552,300

UNITED STATES PATENT OFFICE.

HARRY G. HERSEY, OF GREENVILLE, MAINE.

WEATHERPROOF POLE OR POST.

Application filed November 26, 1924. Serial No. 752,483.

*To all whom it may concern:*

Be it known that I, HARRY G. HERSEY, a citizen of the United States, residing at Greenville, in the county of Piscataquis and State of Maine, have invented certain new and useful Improvements in Weatherproof Poles or Posts, of which the following is a specification.

My said invention relates to weather-proof poles or posts and it is an object of the same to provide a device of this character which shall be strong and durable but at the same time inexpensive in construction.

Referring to the accompanying drawings which are made a part hereof and on which similar reference characters indicate similar parts—

Figure 1 is an elevation of my device with a part broken away to show the interior of the same, and Figure 2 a horizontal section on line 2—2 of Figure 1.

In the drawings reference character 10 indicates a series of timbers, one at each corner of the pole or post which is the subject of my invention, these timbers extending throughout the length of the construction. Strips of board 11 are fastened to the timbers 10 by nails or other convenient means, from end to end of the post. At one side of the structure these boards are extended as at 12 and 13 alternately to opposite sides of the post to provide a ladder extending to the top of the same. Preferably this ladder will begin some little distance above the lower end of the post to permit the lower end to be placed in the ground without interference on account of the lateral projections.

The skeleton frame of the post or pole is now wrapped with wire netting 14 and this is covered with a layer of plastic material 15 preferably made up of Portland cement and sand mixed with hair or pounded rope and water. This coating hardens quickly and retains its shape, thereby protecting the frame of the post from the action of the weather. Preferably the post is closed at both ends as shown in Figure 1 and the coating of cement extends over both ends.

If the post is to be set in marshy or boggy ground a hole 16 is left in the side of the post at an appropriate distance above the level of the ground and after the post or pole is set it will be filled with cement up to a point preferably a foot or more above the level of the ground. This keeps the water out and prevents the framework from rotting. One or more holes 17 may also be left in the top of the pole to dry out the frame which holes should of course be so constructed that the rain cannot enter.

Various other changes may be made in my device all as will be obvious to those skilled in the art and therefore I do not limit myself to what is shown in the drawings and described in the specification, but only as indicated in the appended claims.

Having thus fully described my said invention, what I claim as new and desire to secure by Letters Patent, is:

1. A hollow reenforced plastic covered pole or post comprising a plurality of uprights having strips secured thereto in spaced relation some of said strips at one side of the post extending outwardly beyond the surface of the post and forming a ladder said post having a ventilating passage communicating with its interior adjacent the top thereof, and having a second passage communicating with its interior adjacent the lower end thereof adapted to receive solidifiable material, substantially as set forth.

2. A hollow reinforced pole or post comprising a hollow frame formed of a plurality of uprights and strips secured thereto and extending across the same in spaced relation, some of said spaced strips at one side of the post projecting outwardly beyond the surface of the post and forming a ladder, and a reinforcing and weather resisting coating of cementitious material covering said post, substantially as set forth.

In witness whereof, I have hereunto set my hand and seal at Greenville, Maine, this 24th day of November, A. D. nineteen hundred and twenty-four.

HARRY G. HERSEY. [L. S.]